US011587161B2

(12) United States Patent
Shiu et al.

(10) Patent No.: US 11,587,161 B2
(45) Date of Patent: Feb. 21, 2023

(54) EXPLAINABLE COMPLEX MODEL

(71) Applicant: INTUIT INC., Mountain View, CA (US)

(72) Inventors: Eric King Loong Shiu, Milpitas, CA (US); Christopher Z. Lesner, Palo Alto, CA (US); Alexander S. Ran, Palo Alto, CA (US); Marko Sasa Rukonic, San Jose, CA (US); Wei Wang, San Jose, CA (US); Zhicheng Xue, Union City, CA (US)

(73) Assignee: INTUIT INC., Mountain View, CA (US)

( * ) Notice: Subject to any disclaimer, the term of this patent is extended or adjusted under 35 U.S.C. 154(b) by 186 days.

(21) Appl. No.: 16/823,822

(22) Filed: Mar. 19, 2020

(65) Prior Publication Data

US 2021/0295427 A1  Sep. 23, 2021

(51) Int. Cl.
*G06Q 40/02*  (2023.01)
*G06N 20/00*  (2019.01)
*G06F 40/30*  (2020.01)
*G06Q 50/26*  (2012.01)
*G06N 5/04*  (2023.01)

(52) U.S. Cl.
CPC .......... *G06Q 40/025* (2013.01); *G06F 40/30* (2020.01); *G06N 5/04* (2013.01); *G06N 20/00* (2019.01); *G06Q 50/26* (2013.01)

(58) Field of Classification Search
CPC .... G06Q 40/025; G06Q 50/26; G06Q 20/203; G06N 20/00; G06N 5/04; G06K 9/6232; H04L 63/1441; G06F 40/30

USPC ..... 705/2, 3, 7.29, 35, 38, 39, 311; 707/707; 706/12; 600/595
See application file for complete search history.

(56) References Cited

U.S. PATENT DOCUMENTS

| | | | | |
|---|---|---|---|---|
| 8,504,470 | B1 * | 8/2013 | Chirehdast | G06Q 40/02 705/38 |
| 8,660,943 | B1 * | 2/2014 | Chirehdast | G06Q 40/00 705/38 |
| 2004/0267596 | A1 * | 12/2004 | Lind | G06Q 30/0202 705/7.29 |
| 2010/0082469 | A1 * | 4/2010 | Oliveira | G06Q 40/00 705/35 |

(Continued)

OTHER PUBLICATIONS

XGBoost Algorithm—Long May She Reign by Vishal Morde in Towards Data Science on Apr. 7, 2019; 14 pages.*

(Continued)

*Primary Examiner* — Alexander G Kalinowski
*Assistant Examiner* — Sanjeev Malhotra
(74) *Attorney, Agent, or Firm* — Patterson + Sheridan, LLP

(57) ABSTRACT

Certain aspects of the present disclosure provide techniques for generating a human readable summary explanation to a user for an outcome generated by a complex machine learning model. In one embodiment, a risk assessment service can receive a request from a user in which a risk model of the risk assessment service performs a specific task (e.g., determining the level of risk associated with the user). Once the risk model determines the risk associated with the user, in order to comply with regulations from a compliance system, the risk model can provide a user with an explanation as to the outcome for transparency purposes.

16 Claims, 5 Drawing Sheets

(56) References Cited

U.S. PATENT DOCUMENTS

| | | | | |
|---|---|---|---|---|
| 2013/0198119 | A1* | 8/2013 | Eberhardt, III | G06N 20/00 706/12 |
| 2013/0332194 | A1* | 12/2013 | D'Auria | G16H 10/60 705/3 |
| 2015/0154719 | A1* | 6/2015 | Ishikawa | G06Q 50/182 705/311 |
| 2015/0317449 | A1* | 11/2015 | Eder | A61B 5/1118 600/595 |
| 2015/0348187 | A1* | 12/2015 | McCarl | G06Q 40/025 705/38 |
| 2016/0188812 | A1* | 6/2016 | Biem | G16H 70/20 705/2 |
| 2016/0203221 | A1* | 7/2016 | Rao | G06Q 50/01 707/707 |
| 2016/0253672 | A1* | 9/2016 | Hunter | G06Q 40/06 705/39 |
| 2016/0321582 | A1* | 11/2016 | Broudou | G06N 20/00 |
| 2017/0228635 | A1* | 8/2017 | Diev | G06N 3/02 |
| 2017/0230417 | A1* | 8/2017 | Amar | H04L 63/08 |
| 2017/0230418 | A1* | 8/2017 | Amar | H04L 67/01 |
| 2018/0018602 | A1* | 1/2018 | DiMaggio | G16H 40/20 |
| 2018/0307843 | A1* | 10/2018 | Marsh | G06Q 10/0635 |
| 2018/0322406 | A1* | 11/2018 | Merrill | G06N 20/00 |
| 2019/0114549 | A1* | 4/2019 | Olsher | G06F 40/30 |
| 2019/0258807 | A1* | 8/2019 | DiMaggio | G06F 21/577 |
| 2019/0281076 | A1* | 9/2019 | Watson | G06Q 20/4016 |
| 2019/0304607 | A1* | 10/2019 | Steele | G16H 10/60 |
| 2020/0090185 | A1* | 3/2020 | Chong | G06Q 30/018 |
| 2020/0134489 | A1* | 4/2020 | Achin | G06Q 10/06 |
| 2020/0143263 | A1* | 5/2020 | Morin | H04L 67/1095 |
| 2020/0257992 | A1* | 8/2020 | Achin | G06N 20/10 |
| 2020/0265336 | A1* | 8/2020 | Merrill | G06N 20/20 |
| 2020/0357060 | A1* | 11/2020 | Dalinina | G06K 9/6232 |
| 2020/0357062 | A1* | 11/2020 | Belanger | G06Q 40/025 |
| 2020/0358808 | A1* | 11/2020 | Yampolskiy | H04L 67/10 |
| 2020/0394332 | A1* | 12/2020 | Jakobsson | G06F 16/24573 |
| 2020/0412754 | A1* | 12/2020 | Crabtree | H04L 43/08 |
| 2021/0012904 | A1* | 1/2021 | Simon | G16H 10/60 |
| 2021/0044671 | A1* | 2/2021 | Orbach | G06Q 50/01 |
| 2021/0049503 | A1* | 2/2021 | Nourian | G06N 7/023 |
| 2021/0065191 | A1* | 3/2021 | De Shetler | G06Q 20/4016 |
| 2021/0081566 | A1* | 3/2021 | Broudou | G06V 30/416 |
| 2021/0092161 | A1* | 3/2021 | Crabtree | G06F 16/2477 |
| 2021/0133605 | A1* | 5/2021 | Greene | G06F 16/252 |
| 2021/0158221 | A1* | 5/2021 | Marlin | G06Q 30/0201 |
| 2021/0232940 | A1* | 7/2021 | Dalli | G06N 5/022 |
| 2021/0241871 | A1* | 8/2021 | Burnett | G16H 70/60 |
| 2021/0256377 | A1* | 8/2021 | Dalli | G06N 20/00 |
| 2021/0319887 | A1* | 10/2021 | Derrick, Jr. | A61B 5/7275 |

OTHER PUBLICATIONS 9.5 Shapley Value from the Book—Interpreatble Machine Learning by Christoph Molnar; 17 pages.*

Shapley Value from Wikipedia; 12 pages.*

Wei Wang, et al., Using Small Buisness Banking Data for Explainable Credit Risk Scoring. Association for the Advancement of Artificial Intelligence. 2020.

Scott M. Lundberg, et al., A Unified Approach to Interpreting Model Predictions, 31st Conference on Neural Information Processing Systems (NIPS 2017). Available at: https://papers.nips.cc/paper/7062-a-unified-approach-to-interpreting-model-predictions.pdf.

* cited by examiner

YOUR RISK SCORE IS 89.

Due to the amount owed on your accounts (#12345, #98760), you are predicted to be at risk for defaulting on the requested loan and your loan request is DENIED.

Please re-submit your request after addressing the issues above.

RE-SUBMIT

If you believe there is an error, please let us know or how we can improve.

ERROR FEEDBACK

FIG. 3

EXPLAINABLE COMPLEX MODEL

INTRODUCTION

Aspects of the present disclosure relate to a method and system for generating a summary explanation for an outcome of a complex machine learning model. In particular, embodiments of the present disclosure relate to identifying feature(s) of user data with the greatest impact on the outcome of a complex machine learning model and providing a human-readable explanation to allow the user to better understand the outcome.

INTRODUCTION

The implementation of complex machine learning models for performing tasks on behalf of a user (e.g., making a decision, generating an outcome, etc.) is becoming more and more widespread. Complex machine learning models are trained to take into account thousands of factors and the relationships between such factors when performing a task for a user. As compared to a human user performing the task, a complex machine learning model is able to perform the task in less time and with a higher degree of accuracy. Further, in some cases, it would be impractical for a user to perform such tasks as they include reviewing thousands of factors and the relationship between such factors.

Despite the growth associated with implementing complex machine learning models, such implementation is not without constraints. Certain industries are highly regulated, such as finance, pharmaceuticals, accounting, etc. In such regulated industries, an organization or entity is responsible for establishing a set of compliance regulations for privacy, security, transparency, etc., purposes. The complex machine learning models implemented in such regulated industries are not exempt from adhering to the compliance regulations.

For example, the Federal Trade Commission (FTC) regulates the financial industry (e.g., credit reporting), and as such, the FTC requires decisions based on a person's financial information be explained to that person, especially those decisions that negatively impact the person. In one example, under the Fair Credit Reporting Act, if someone submits a loan application and is denied the loan, then the FTC requires that person be provided an explanation as to why their loan application was denied.

Therefore, a solution is needed in order to implement complex machine learning models in compliance with the regulations established within an industry.

BRIEF SUMMARY

Certain embodiments provide a method for generating an explanation regarding an outcome of a complex machine learning model (e.g., risk model). The method generally includes accessing a set of user data from one or more user accounts. The method further includes extracting a set of features from the set of user data corresponding to user risk activity. The method further includes generating, via a risk model, an attribution value for each feature of the set of features. The method further includes generating, based on the set of features, a risk score corresponding to the user activity via the risk model. The method further includes determining the risk score does not meet a pre-determined threshold. The method further includes generating a human-readable explanation indicating a reason that the risk score does not meet the pre-determined threshold, the generating of the human-readable explanation comprising determining, from the set of features, a feature with a highest attribution value and selecting the human-readable explanation based on a mapping of the human-readable explanation to the feature with the highest attribution value.

Other embodiments provide a system configured to perform methods for generating an explanation regarding an outcome of a complex machine learning model, such as the aforementioned method, as well as non-transitory computer-readable storage mediums comprising instructions that, when executed by a processor of a processing system, cause the processing system to perform methods for generating a summary explanation regarding an outcome of a complex machine learning model.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 3 depicts an example user interface depicting an explanation according to an embodiment.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
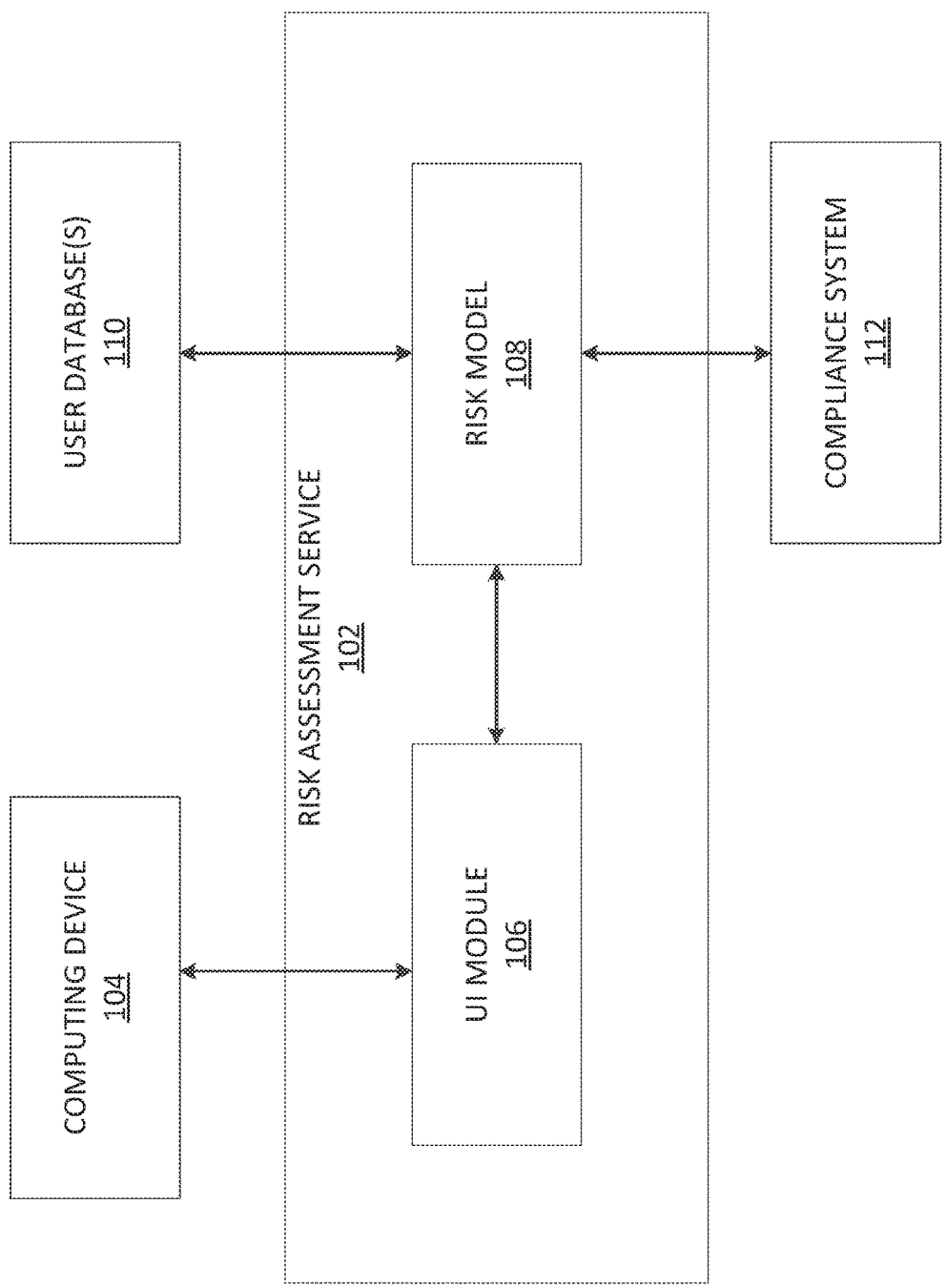
FIG. 1 depicts an example computing environment for generating an explanation in compliance with a regulatory authority according to an embodiment.

Aspects of the present disclosure provide apparatuses, methods, processing systems, and computer readable mediums for generating an explanation for an outcome of a complex machine learning model (e.g., a risk model).

To implement a complex machine learning model in a regulated industry, upon receiving a request from a user to perform a task (e.g., generate and/or determine an outcome), a complex machine learning model of a risk assessment service performs the task requested based on compliance regulation(s) received from a compliance system. The complex machine learning model performs the task and provides the outcome to the user per the compliance regulation by mapping the outcome to a specific regulation (e.g., a compliance code for the explanation to provide to the user).

In one embodiment, a risk assessment service receives a request from a user to perform a task. The submission of the request to the risk assessment service includes determining a risk level associated with the user. The risk assessment service performs the task of determining the risk level (e.g., risk score) via a risk model (e.g., non-linear, linear, etc.). The risk model is a complex machine learning model that is trained to review thousands of factors and corresponding relationships between the factors to generate an outcome based on the review of user data.

To review the factors and corresponding relationships, the risk assessment service retrieves user data, with user authorization, and extracts features from the user data. The extracted features are then input to the risk model. By inputting the features to the risk model, the risk assessment service determines an outcome associated with the user. If the outcome associated with the user corresponds to a particular category, the compliance regulations require the risk assessment service to provide a summary explanation of the outcome to the user. The risk assessment service then generates the summary by mapping the outcome to a compliance regulation that includes, for example, a compliance code and/or a reason. The human-readable explanation is then displayed to the user.

For example, in the financial industry, a user can submit a request to a risk assessment service for a loan via a financial services application. In some cases, the risk assessment service, upon receiving the request for a loan, determines the risk level associated with approving the loan to the user. The risk level can be a risk score generated by a risk model (e.g., non-linear, linear, etc.) that reviews thousands of features and relationships extracted from user data to determine whether the user is predicted to default on the loan if approved. If the risk score is high (or fails to meet a pre-determined threshold), indicating the user is likely to default on the loan, then the risk assessment service can deny the user's request for the loan.

Since the financial services industries are regulated by the Fair Credit Reporting Act, which requires the user be made aware of the specific reason their loan application was denied, the risk model identifies the feature(s) that had the greatest influence or impact on determining that the user is likely to default on the loan if it were to be approved. In some cases, a Shapley value is calculated by the risk model for each feature, and the feature(s) with the highest value impacting the risk score (and predicted outcome) is identified. Based on the identified feature(s), the risk model maps the features to a compliance regulation from a compliance system. In some cases, the compliance regulation can include a set of codes corresponding to features, and each code can be associated with a human-readable explanation. By mapping the feature to the compliance regulation, the risk model can identify the reason the loan application was denied and provide the reason to the user. In some cases, the explanation provided to the user is standard or customized by the risk model.

The risk model of the risk assessment service is not limited to the financial services industry. The risk model can be trained and implemented in any number of regulated industries, such as housing, pharmacy, accounting, healthcare, insurance, etc. to provide a human-readable explanation associated with the outcome of the risk model. For example, the risk model can generate an outcome and provide an explanation as to why a user was denied an apartment lease (e.g., history of late rent payments), why a user is prescribed a certain dosage of a medicine (e.g., due to age) or a particular type of medicine (e.g., due to allergies), why a user was denied insurance (e.g., history of car accidents), etc.

Example Computing Environment for Generating an Explanation

FIG. 1 depicts an example computing environment 100 for generating a summary explanation for the outcome of a risk model implemented in a regulated industry. The example computing environment 100 includes a risk assessment service 102, a computing device 104, user database(s) 110, and a compliance system 112.

As depicted, the risk assessment service 102 includes a user interface (UI) module 106 and a risk model 108. The risk assessment service 102 can operate as part of a software program, application, software as a service, etc. The risk assessment service 102 can be implemented in a regulated industry to perform specific task(s) in compliance with regulations from a compliance system 112. For example, the risk assessment service 102 can determine a requested outcome including the level of risk associated with a user interacting with the service and provide the user with an explanation of the outcome and level of risk in compliance with regulations received from a compliance system 112.

The UI module 106 of the risk assessment service 102 generates a UI for a computing device 104 (e.g., smartphone, tablet, desktop, laptop, or other computing devices with same or similar capabilities) interacting with the risk assessment service 102. Through the UI generated by the UI module 106, the risk assessment service 102 receives a request from a user to perform a particular task. For example, a risk assessment service 102 implemented in the financial industry can receive a request for a loan via an application to determine whether or not the user is qualified for a loan. In some cases, the request may be for the user submitting the request to the risk assessment service. In other cases, the request may be on behalf of another user. For example, a bank employee (e.g., a third party) can submit the request for the loan via the application on behalf of a bank customer to determine via the risk assessment service 102 whether to provide the bank customer with the loan.

Upon receiving the request via the UI module 106, the risk assessment service 102 triggers the risk model 108 to perform the task. Continuing the example above, once the risk assessment service 102 receives the loan application, the risk model 108 can generate a risk score for the user. The risk model 108 is complex machine learning model trained to review a large amount of user data by extracting features and relationships from the user data and generating an outcome and explanation to the user. For example, the risk model 108 can be a non-linear risk model (e.g., XGBoost, Scorecard, GBDT (sklearn), Random Forest, Neural Network, Logistic Regression, etc.), a linear risk model, etc. In some cases, the risk model is a XGBoost non-linear risk model with monotonic constraints.

In order to perform the requested task, the risk assessment service 102 retrieves user data from user database(s) 110. In some cases, the user provides authorization for the risk assessment service 102 to access the user database(s) 110 to retrieve user data. The authorization can include providing the risk assessment service 102 a user name, password, credentials, or other types of data authorizing the risk assessment service 102 access to the user database(s) 110 on behalf of the user. The user database(s) 110 can include user data pertaining to the user that has been collected by the risk assessment service 102 (or services associated with the risk assessment service 102). The risk assessment service 102 can collect and store user data that risk assessment service 102 is permitted by law (or regulations) and the user to collect in the user database(s) 110.

Once the risk assessment service 102 retrieves the user data, the risk assessment service 102 extracts features from the user data. In some cases, the features are extracted from the user data by transforming the user data into a set of categories by associating each user data in the set of user data with a respective category. The transformation of the user data is based at least in part on knowledge extracted from and/or models trained on previously collected data where associations are established between the previously collected data and the corresponding category.

In the example of the loan application request submitted via an application, the user data can include financial data of the user that is transformed into domain specific categories (e.g., a spending category, an income category, etc.). The features are extracted from user data based on previously determined domain specific knowledge and/or a set of models trained on similar data from the same domain knowledge (e.g., finance) that have established associations between domain specific categories and the user data. By categorizing the user data to domain specific categories, features are identified for extraction from the user data.

The extracted features from the user data are input to the risk model 108. The risk model 108 is a complex machine learning model trained to receive as input thousands of features and relationships between such features. In some cases, the risk model 108 is trained on training data that includes historical user data collected, historical risk scores calculated, and the actual outcomes. As part of training the risk model 108, a Weight of Evidence value is calculated for each feature in the training data to identify whether the feature causes the risk score to increase or decrease. The training data is used to construct a model that estimates the probability of an outcome. Further, the training of the model is constrained based at least in part on the Weight of Evidence value (e.g., training input data's increase or decrease to a risk score matches the direction of increase or decrease indicated by the Weigh of Evidence value).

Continuing the example above, the risk model 108 of the risk assessment service 102 reviewing a loan application is trained on previous requests for loan applications, the user data associated with the loans, and the respective associated actual outcome (e.g., whether the loan applicant actually paid back or defaulted on an approved loan). In some cases, the risk model 108 is trained to identify based on an actual outcome where a user defaulted on an approved loan, which feature(s) the user had in the historical user data that resulted in the default. The risk model 108 is trained as such so that when implemented, the risk model 108 can more accurately predict the likelihood of a user defaulting on an approved loan.

With the extracted features input to the risk model 108, the risk model 108 generates a risk score associated with the user. The risk score corresponds to a predicted outcome associated with the user. In some cases, the risk model 108 also generates an attribution value associated with each feature input to the risk model 108 that identifies how much (or to what degree) of the outcome corresponding to the risk score is attributed to the feature. For example, a Shapley value for each feature can be calculated by the risk model 108.

Upon calculating the risk score and generating the attribution value associated with each feature regarding impact on the outcome, the risk model 108 determines whether the predicted outcome that corresponds to the risk score meets a pre-determined threshold. For example, the pre-determined threshold can be a range of values. If the calculated risk score meets the pre-determined threshold (e.g., the risk score falls within the range of values), then the corresponding predicted outcome is positive. In such case, the positive predicted outcome indicates that the user is not at risk, and, in the case of the loan application, eligible for the loan. If the calculated risk score fails to meet the pre-determined threshold (e.g., the risk score falls outside the range of values), then the corresponding predicted outcome is negative. In such case, the negative predicted outcome indicates that the user is at risk, and, in the case of the loan application, not eligible for the loan.

In some cases, the pre-determined threshold (e.g., a range of values, a maximum value, etc.) is received and established by a compliance system 112. For example, the compliance system 112 can provide (and updated) compliance regulations, indicating which category an outcome is associated with and instructions regarding how to proceed.

In the example of the loan application, if the risk score exceeds the pre-determined threshold (e.g., a maximum value) and the loan application is rejected because the user is predicted to default on the loan, the compliance regulation indicates that the risk model 108 determine the reason for rejecting the loan application. In such an example, the risk model 108 determines the reason for rejecting the loan application by reviewing the Shapley values to identify which feature(s) had the highest values, which corresponds to the greatest impact on the outcome. Based on the feature(s) with the highest Shapley values, the risk model 108 can determine, by mapping to a compliance regulation (e.g., a code), an explanation as to why the loan application was rejected.

In some cases, the risk model 108 can provide the human-readable explanation to the user even if the user does meet the pre-determined threshold. The human-readable explanation provides transparency to the user of how the risk model 108 of the risk assessment service operates. As such, compliance regulations may request explanations to be provided to the user in every instance of assessment by the risk assessment service 102.

Upon determining the mapping of a feature to a compliance regulation, which can include a code associated with a explanation, the risk model 108 provides the explanation to the UI module 106 to generate and display the human-readable explanation to the user (or to third parties, such as the compliance system), in compliance with regulations from the compliance system 112.

In some cases, the risk assessment service 102 (e.g., via the risk model 108) can generate a standard explanation to the user. For example, if the user had too many instances of overdrawing from their account, then the standard explanation determined by the risk model 108 and displayed by the UI module 106 can state: "Due to the number of instances of overdrawing from your account(s), your loan application is denied."

In other cases, the risk assessment service 102 (e.g., via the risk model 108) can customize the reasoning specific to the user (e.g., identifying a specific account, transaction, etc., that resulted in the loan application being denied). For example, if the user had too many instances of overdrawing from their account, then the customized explanation displayed by the UI module 106 can state: "Due to the 5 instances of overdrawing from your checking account #123456789, on Jan. 7, 2020; Jan. 12, 2020; Jan. 22, 2020; Jan. 25, 2020; and Feb. 20, 2020, your loan application is denied."

Example Compliance Mapping

Figure 2:
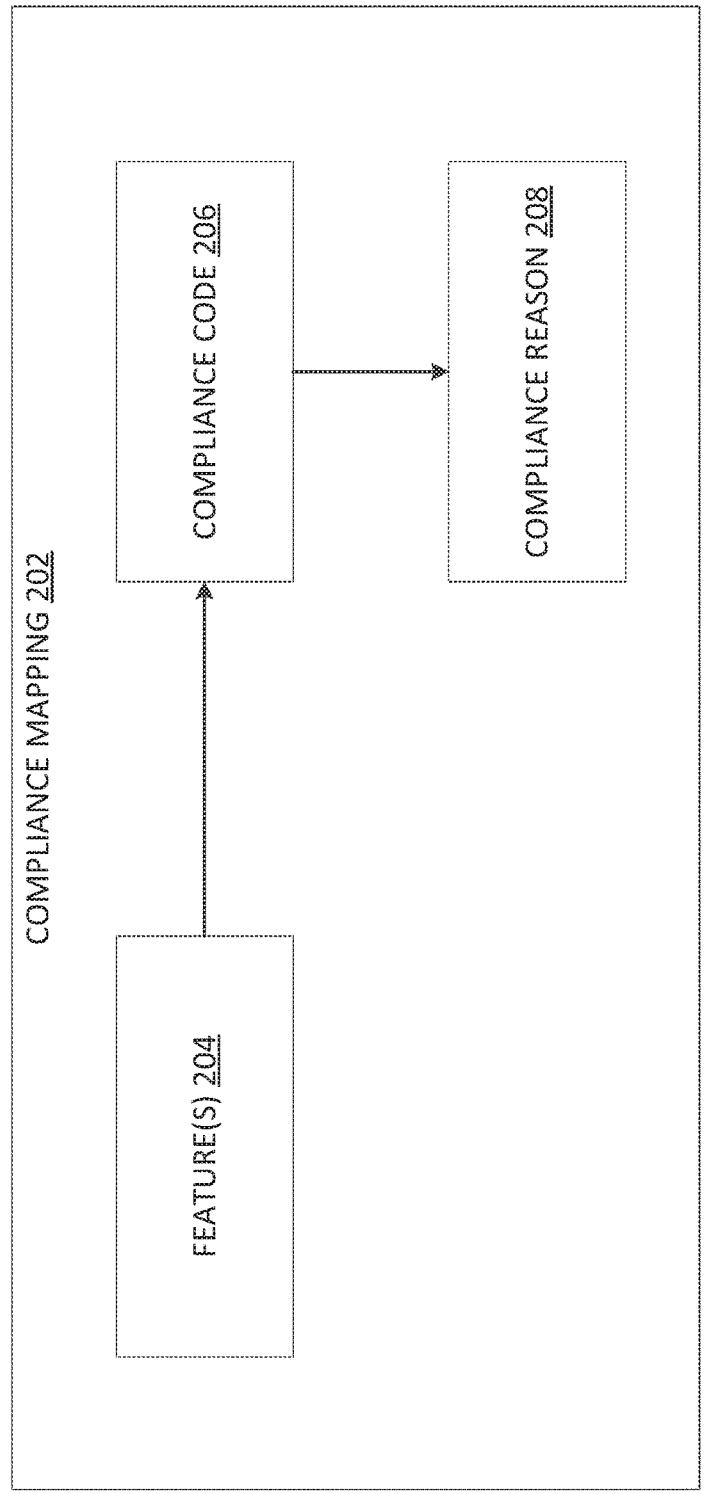
FIG. 2 depicts an example compliance mapping according to an embodiment.

FIG. 2 depicts an example diagram 200 of a compliance mapping 202. The compliance mapping 202 maps one or more features 204 extracted from user data to a compliance code 206. The compliance code 206 can refer to a value in a table, list, etc. that is established by the compliance system.

The mapping of the feature 204 to a compliance code 206 is based on compliance regulation(s) generated by a compliance system and provided to the risk assessment service. In some cases, features 204 that are semantically related can map to the same compliance code 206. To determine semantically related features, a risk assessment service can use natural language processing techniques. In some cases, the risk assessment service can calculate similarity scores associated with the features to determine related features (e.g., Jacard similarity index or coefficient, Cosine similarity, etc.).

Once the feature(s) 204 are mapped to a compliance code 206, the feature(s) 204 are associated with the compliance reason 208 established by the compliance system. The compliance reason 208 is a human readable explanation that corresponds to the compliance code 206. In some cases, the compliance reason is a standard explanation that the risk model of the risk assessment service can provide to the user or customize before providing to the user. The compliance reason 208 is determined by the compliance system and provided to the risk assessment service.

For example, in the financial services industry, when a user is applying for a loan, the risk model determines a risk score for the user, predicting whether the user will default on a loan. In order to comply with regulations in the financial industry (e.g., Fair Credit Reporting Act), the risk model also provides a summary explanation to the user that the user can understand in the event that the user's loan application is denied.

In order to provide an explanation to the user, the risk model calculates a value for how much each feature of the user data impacted the user's risk score. For example, a Shapley value is generated for each feature. Based on the feature(s) with the highest Shapley value, the risk model maps the feature to a compliance code. In the financial services industry, such code can be the adverse action code that corresponds to a feature(s). The adverse action code can be determined by a compliance system and provided to the risk assessment service.

For example, if the feature with the highest Shapley value is exceeding the number of instances of overdrawing from an account in a given period of time, then that feature is mapped to the corresponding adverse action code. In such an example, the adverse action code is associated with an explanation that is provided to the user (e.g., in a generated UI). The explanation can indicate to the user that the reason for denying the loan application is due to "Level of delinquency on accounts."

Once the risk model maps the feature to a code, the risk model is able to retrieve a compliance reason 208 associated with the code. In some cases, the compliance reason 208 is associated with the compliance code 206 by the compliance system. In some cases, the compliance reason 208 (e.g., human-readable summary explanation) is mapped to the compliance code 206 based on Weight of Evidence (WoE) and features. With the compliance reason retrieved based on compliance regulation(s), the risk model is able to provide a reason to the user for the outcome generated by the risk model. In some cases, the reason (e.g., human-readable explanation) is a standard explanation. In other cases, the reason is customized by the risk model to provide to the user.

Example User Interface for a Summary Explanation

FIG. 3 depicts an example user interface 300 for displaying a summary explanation of an outcome of a complex machine learning model, as described with respect to FIGS. 1-2. The example user interface 300 is generated by the risk assessment service and provides an explanation, understandable by a user as to the outcome generated by the risk model of the risk assessment service.

As depicted, the example user interface 300 illustrates the explanation of an outcome of a user requesting a loan through the risk assessment service of a software program, application, software as a service, etc. The example user interface 300 illustrated includes the risk score 302, the reason 304 for the outcome, a re-submission request 306, a button 308 associated with the re-submission request, a request for user feedback 310, and a button associated with the feedback.

The risk score 302 is displayed to the user as "YOUR RISK SCORE IS 89" and includes the value calculated by the risk model of the risk assessment service ("89"). The reason 304 is displayed to the user that includes the outcome of the user's request for a loan and the reason: "Due to the amount owed on your accounts (#12345, #98760), you are predicted to be at risk for defaulting on the requested loan and your loan request is DENIED."

The reason 304 depicted in the example user interface 300 is customized for the user, providing specific details as to why the loan request was denied. In other cases, a standard reason can be included as to why the loan request was denied. The reason 304 displayed is in compliance with regulations from a compliance system for purposes of transparency to the user.

The example user interface 300 includes a request to the user for re-submitting the request 306 (e.g., "Please re-submit your request after addressing the issues above."). In some cases, the reason identified for the outcome and included in reason 304 is something the user can correct. As such, the request for re-submission provides the user another opportunity to determine whether to approve a loan to the user.

The user can re-submit the request for a loan by selecting button 308. In some cases, the selection of button 308 takes the user to the beginning of the loan application process. In other cases, once the user corrects any deficiencies associated with why the loan was denied, then by selecting button 308, the risk assessment service determines the risk level associated with the user automatically with the corrected information without the user having to re-enter all of the loan application data.

The example user interface 300 includes a request for user feedback 310 (e.g., "If you believe there is an error, please let us know or how we can improve."). The request for user feedback 310 is for the user to provide feedback to the risk assessment service as to how the service is performing.

For example, when providing feedback, the user can select the feedback button 312 and enter feedback indicating that incorrect information was used in determining the risk score, incorrect information was presented to the user, etc., that assists the risk assessment service in training the risk model to avoid such mistakes. The feedback entered can also include information about what the users liked or would like to see as part of the outcome explanation. An authorized entity associated with the risk assessment service can review the feedback and update the risk assessment service accordingly, and in compliance with regulations from a compliance system.

Example Method for Generating a Summary Explanation

Figure 4:
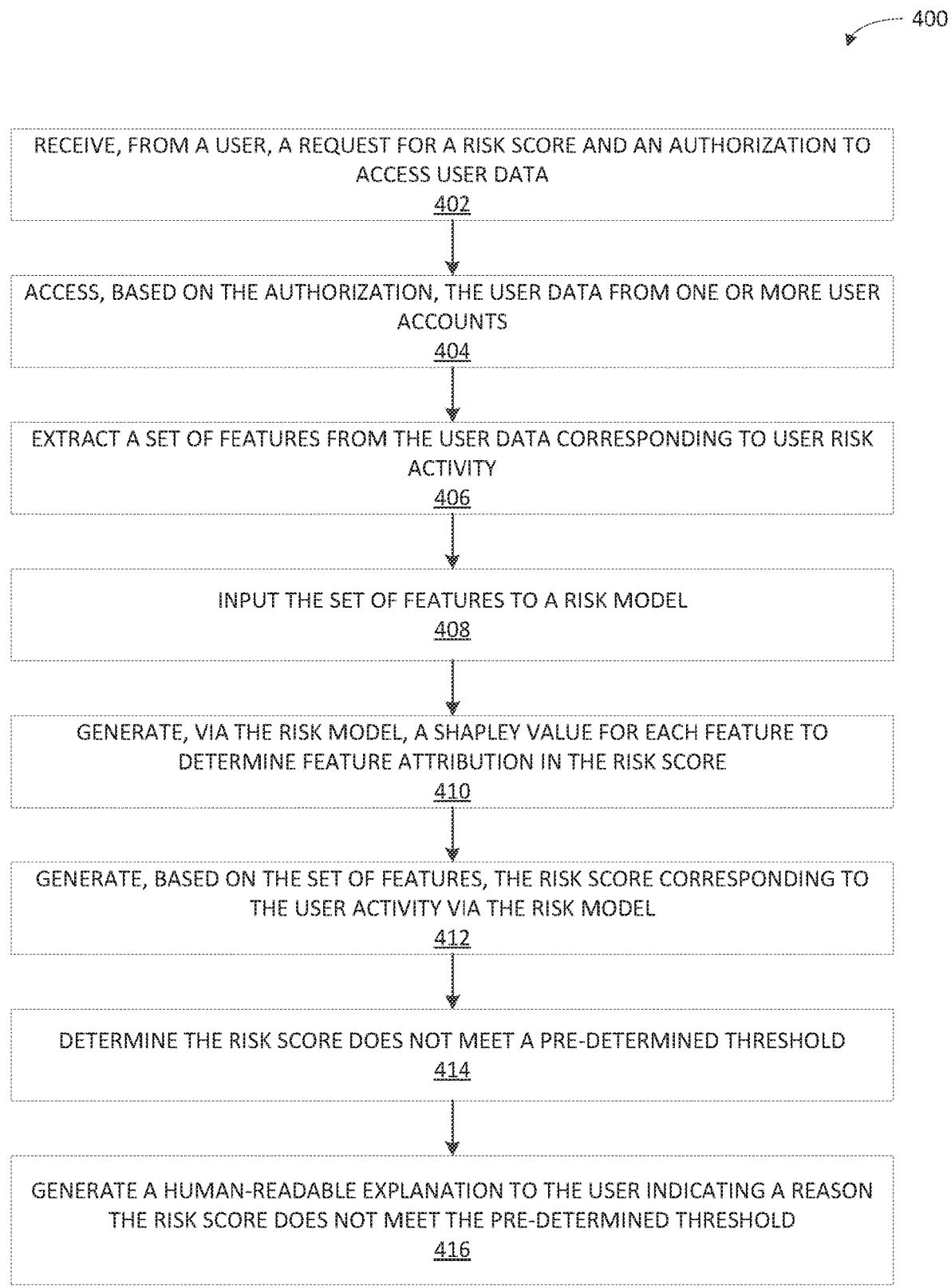
FIG. 4 depicts an example method for generating an explanation according to an embodiment.

FIG. 4 depicts an example method 400 for generating a summary explanation for an outcome of a complex machine learning model as described with respect to FIGS. 1-3.

At step 402, a risk assessment service receives, from a user, a request for a risk score and an authorization to access user data.

At step 404, a risk assessment service accesses, based on the authorization, the user data from one or more user accounts. In some cases, the user data is stored in database(s) associated with the risk assessment service. The user data stored in the database(s) is collected by the risk assessment service (or associated services) when the user is interacting with the software program implementing the risk assessment service. The collection of user data is based on approval by the user and in compliance with laws and/or regulations regarding data collection.

At step 406, a risk assessment service extracts a set of features from the user data corresponding to user risk activity. The user data corresponds to user risk activity and can indicate high risk or low risk associated with the user's activity. In some cases, the risk assessment service extracts the features from the user data by transforming the user data to a corresponding category. By categorizing the user data, features can be identified and extracted for input to a risk model, as described at step 408.

At step 408, a risk assessment service inputs the set of features to a risk model. In some cases, the risk model is a linear model, a non-linear model, etc. In some cases, the risk model is a XGBoost non-linear risk model. In such cases, the XGBoost non-linear risk model can include monotonic constraints.

At step 410, a risk assessment service generates, via the risk model, an attribution value for each feature of the set of features. The attribution value indicates how much (e.g., to what degree) a feature impacts an outcome (e.g., a risk score). In one case, an attribution value is a Shapley value that determines feature attribution in the risk score.

At step 412, a risk assessment service generates, based on the set of features, the risk score (e.g., risk value) corresponding to the user activity via the risk model. In some cases, if the risk score does not meet a pre-determined threshold (e.g., exceeding a threshold value or outside a threshold value range), this indicates a high level of risk associated with the user. The risk score corresponds to a predicted outcome associated with the user.

At step 414, a risk assessment service determines the risk score does not meet a pre-determined threshold. In some cases, a negative predicted outcome is determined if the risk score does not meet the pre-determined threshold. In other cases, a positive predicted outcome is determined if the risk score does meet the pre-determined threshold. For example, in the financial services industries, where a user has submitted a loan application, if the risk score for the user is high and does not meet the pre-established threshold for approving a loan application, then the user's loan application is denied because the user is predicted to default on the loan (e.g., negative predicted outcome).

At step 416, a risk assessment service generates a human-readable explanation to the user indicating a reason the risk score does not meet the pre-determined threshold. In some cases, the human-readable explanation is based on mapping the features to a code in the compliance regulations that is associated with a human readable explanation and WoE. In such case, the explanation is provided to the user, either in the standard format generated or a custom version of the explanation generated. For example, the feature that has the highest attribution (e.g., Shapley) value is identified. Based on the mapping of the feature with the highest attribution value to a compliance code (e.g., adverse action code, etc.), an associated explanation is selected by the risk model such that the risk assessment service can generate the human-readable explanation to display to the user.

Example Server for Generating a Summary Explanation

Figure 5:
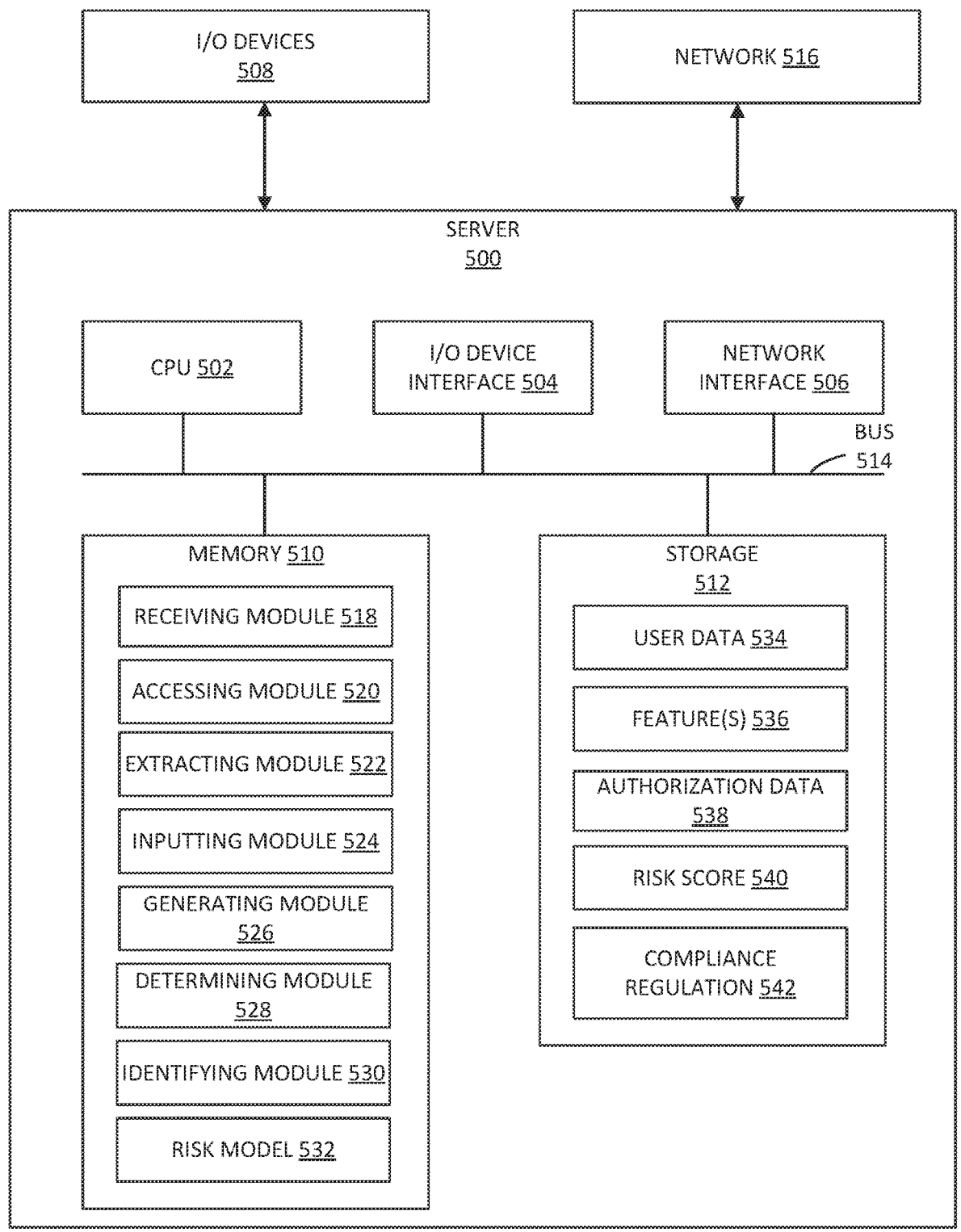
FIG. 5 depicts an example server for generating an explanation according to an embodiment.

FIG. 5 depicts an example server 500 that may perform the methods described herein, such as the method to generate a summary explanation associated with an outcome of a complex machine learning model as described with respect to FIGS. 1-4. For example, the server 500 can be a physical server or a virtual (e.g., cloud) server.

Server 500 includes a central processing unit (CPU) 502 connected to a bus 514. CPU 502 is configured to process computer-executable instructions, e.g., stored in memory 510 or storage 512, and to cause the server 500 to perform methods described herein, for example, with respect to FIGS. 1-4. CPU 502 is included to be representative of a single CPU, multiple CPUs, a single CPU having multiple processing cores, and other forms of processing architecture capable of executing computer-executable instructions.

Server 500 further includes input/output (I/O) device(s) 508 and interfaces 504, which allows server 500 to interface with I/O devices 508, such as, for example, keyboards, displays, mouse devices, pen input, and other devices that allow for interaction with server 500. Note that server 500 may connect with external I/O devices through physical and wireless connections (e.g., external display device).

Server 500 further includes network interface 506, which provides server 500 with access to external network 516 and thereby external computing devices.

Server 500 further includes memory 510, which in this example includes receiving module 518, accessing module 520, extracting module 522, inputting module 524, generating module 526, determining module 528, identifying module 530, risk model 532 (e.g., a non-linear risk model, linear risk model, etc.) for performing operations described in FIGS. 1-4.

Note that while shown as a single memory 510 in FIG. 5 for simplicity, the various aspects stored in memory 510 may be stored in different physical memories, but all accessible by CPU 502 via internal data connections such as bus 514.

Storage 512 further includes user data 534, which may be like the user data such as the transaction data, as described in FIGS. 1-4.

Storage 512 further includes feature(s) 536, which may be like the features extracted from the user data, as described in FIGS. 1-4.

Storage 512 further includes authorization data 538, which may be like the authorization data received from a user to access a user's account(s), as described in FIGS. 1-4.

Storage 512 further includes risk score 540, which may be like the risk score calculated by the risk model, as described in FIGS. 1-4.

Storage 512 further includes compliance regulation(s) 542, which may be like the compliance regulations received from a compliance system (e.g., regulatory authority), as described in FIGS. 1-4.

While not depicted in FIG. 5, other aspects may be included in storage 512.

As with memory 510, a single storage 512 is depicted in FIG. 5 for simplicity, but various aspects stored in storage 512 may be stored in different physical storages, but all accessible to CPU 502 via internal data connections, such as bus 514, or external connection, such as network interfaces

504. One of skill in the art will appreciate that one or more elements of server 500 may be located remotely and accessed via a network 516.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method, comprising:
 receiving a compliance regulation from a compliance system, wherein the compliance regulation includes a mapping of at least one feature from a set of features to at least one human-readable explanation;
 accessing a set of user data from one or more user accounts;
 extracting the set of features from the set of user data corresponding to user risk activity;
 generating, via a risk model, an attribution value for each feature of the set of features, wherein:
  the risk model comprises a probabilistic model trained on training data including a Weight of Evidence value calculated for each feature of the set of features,
  the Weight of Evidence value calculated for each feature corresponds to an indication of whether each feature of the set of features causes an increase or a decrease to risk scores generated by the risk model, and
  a directionality of changes to risk scores generated by the risk model is constrained by the Weight of Evidence value calculated for each feature of the set of features;
 generating, based on the set of features, a risk score corresponding to the user activity via the risk model;
 determining the risk score does not meet a pre-determined threshold; and
 generating a human-readable explanation indicating a reason that the risk score does not meet the pre-determined threshold, the generating of the human-readable explanation comprising:
  determining, from the set of features, a feature with a highest attribution value; and
  selecting the human-readable explanation based on a mapping of the human-readable explanation to the feature with the highest attribution value.

2. The computer-implemented method of claim 1, wherein the risk score corresponds to a predicted outcome associated with the user.

3. The computer-implemented method of claim 2, wherein the predicted outcome is one of:
 a negative predicted outcome if the risk score does not meet the pre-determined threshold; or
 a positive predicted outcome if the risk score meets the pre-determined threshold.

4. The computer-implemented method of claim 1, wherein the risk model is trained with:
 historical user data from a set of users;
 historical risk scores for the set of users; and
 historical actual outcomes associated with the set of users.

5. The computer-implemented method of claim 1, wherein the risk model is a XGBoost non-linear risk model.

6. The computer-implemented method of claim 5, wherein the XGBoost non-linear risk model includes monotonic constraints.

7. The computer-implemented method of claim 1, further comprising:
 receiving feedback from the user based on the human-readable explanation; and
 including the feedback in training the risk model.

8. The computer-implemented method of claim 1, wherein the extraction of the set of features further comprises transforming the set of user data into a set of categories is based on associating each user data in the set of user data with a respective category.

9. A system, comprising:
 a memory having executable instructions stored thereon; and
 a processor configured to execute the executable instructions in order to cause the system to:
  receive a compliance regulation from a compliance system, wherein the compliance regulation includes a mapping of at least one feature from a set of features to at least one human-readable explanation;
  access a set of user data from one or more user accounts;
  extract the set of features from the set of user data corresponding to user risk activity;
  generate, via a risk model, an attribution value for each feature of the set of features, wherein:
   the risk model comprises a probabilistic model trained on training data including a Weight of Evidence value calculated for each feature of the set of features,
   the Weight of Evidence value calculated for each feature corresponds to an indication of whether each feature of the set of features causes an increase or a decrease to risk scores generated by the risk model, and
   a directionality of changes to risk scores generated by the risk model is constrained by the Weight of Evidence value calculated for each feature of the set of features;
  generate, based on the set of features, a risk score corresponding to the user activity via the risk model;

determine the risk score does not meet a pre-determined threshold; and generate a human-readable explanation indicating a reason that the risk score does not meet the pre-determined threshold, wherein in order to generate the human-readable explanation, the processor is configured to cause the system to:
    determine, from the set of features, a feature with a highest attribution value; and
    select the human-readable explanation based on a mapping of the human-readable explanation to the feature with the highest attribution value.

10. The system of claim 9, wherein the risk score corresponds to a predicted outcome associated with the user.

11. The system of claim 10, wherein the predicted outcome is one of:
    a negative predicted outcome if the risk score does not meet the pre-determined threshold; or
    a positive predicted outcome if the risk score meets the pre-determined threshold.

12. The system of claim 9, wherein the risk model is trained with:
    historical user data from a set of users;
    historical risk scores for the set of users; and
    historical actual outcomes associated with the set of users.

13. The system of claim 9, wherein the risk model is a XGBoost non-linear risk model.

14. The system of claim 13, wherein the XGBoost non-linear risk model includes monotonic constraints.

15. The system of claim 9, wherein the processor is further configured to cause the system to:
    receive feedback from the user based on the human-readable explanation; and
    include the feedback in training the risk model.

16. The system of claim 9, wherein the transformation of the set of user data into the set of categories is based on associating each user data in the set of user data with a respective category.

* * * * *